(12) United States Patent
Fraser et al.

(10) Patent No.: US 6,523,683 B1
(45) Date of Patent: Feb. 25, 2003

(54) ENCLOSURE HOLDING DATA CARRIER

(75) Inventors: Anthony Henry Joseph Fraser, Northants (GB); Stefan Alexander Pijanowski, Northants (GB)

(73) Assignee: DuBois Limited (GB)

( * ) Notice: Subject to any disclaimer, the term of this patent is extended or adjusted under 35 U.S.C. 154(b) by 0 days.

(21) Appl. No.: 09/555,724

(22) PCT Filed: Dec. 7, 1998

(86) PCT No.: PCT/GB98/03640

§ 371 (c)(1), (2), (4) Date: Aug. 14, 2000

(87) PCT Pub. No.: WO99/30323

PCT Pub. Date: Jun. 17, 1999

(30) Foreign Application Priority Data

Dec. 5, 1997  (GB) .............................................. 9725876

(51) Int. Cl.[7] .............................................. B65D 85/57
(52) U.S. Cl. ................. 206/308.1; 206/307; 206/308.2; 206/310
(58) Field of Search ................. 206/307, 309, 206/310, 308.1, 308.2; 220/359.1, 359.2, 359.3; 229/92.8, 443

(56) References Cited

U.S. PATENT DOCUMENTS

| | | | | |
|---|---|---|---|---|
| 4,344,537 A | * | 8/1982 | Austin | 229/243 |
| 4,858,780 A | * | 8/1989 | Odaka et al. | 220/359.2 |
| 5,160,767 A | * | 11/1992 | Genske et al. | 220/359.3 |
| 5,445,265 A | | 8/1995 | Herr | |
| 5,638,953 A | * | 6/1997 | House | 226/308.1 |
| 5,690,220 A | | 11/1997 | Swan | |
| 5,697,496 A | * | 12/1997 | Bauer | 206/308.1 |
| 5,722,538 A | * | 3/1998 | Neely et al. | 206/308.1 |
| 5,725,093 A | * | 3/1998 | Yamaguchi et al. | 206/308.1 |
| 5,727,680 A | * | 3/1998 | Liu | 206/308.1 |
| 5,775,492 A | * | 7/1998 | Ban | 206/308.1 |
| 5,857,565 A | * | 1/1999 | Baker et al. | 206/308.1 |
| 6,283,286 B1 | * | 9/2001 | Hu | 206/308.1 |

FOREIGN PATENT DOCUMENTS

| | | |
|---|---|---|
| EP | 0 514 156 | 11/1992 |
| GB | 2311489 | 10/1997 |
| WO | WO 98/14391 | 4/1998 |

* cited by examiner

*Primary Examiner*—Jim Foster
(74) *Attorney, Agent, or Firm*—Dickstein Shapiro Morin & Oshinsky LLP

(57) ABSTRACT

A storage container (10) comprising an outer shell (12) and an insertable drawer member (14) configured and dimensioned for receiving and storing information-bearing discs (16) and accompanying printed matter (17). The insertable drawer member (14) includes features (78) to store the discs (16) by contacting non-information bearing surfaces thereof as well as structure (32, 36) for selectively retrieving the printed matter together with the disc (16) from the outer shell (12). The container (10) of the invention additionally comprises a tamper seal (86) formed integral therewith which fractures the first time the drawer member (14) is withdrawn from the shell (12) for determining whether the storage container (10) has ever been opened to access its contents after it was sealed at the factory.

6 Claims, 3 Drawing Sheets

ENCLOSURE HOLDING DATA CARRIER

TECHNICAL FIELD

This invention relates to an enclosure holding a data carrier such as a compact disk (CD) or digital versatile disk (DVD).

BACKGROUND ART

There are many types of enclosure available for housing CDs and other forms of data carrier, the most well-known being a hinged box formed of clear polystyrene known as a 'jewel box' used to hold CDs.

The present invention provides an enclosure for a data carrier having features and advantages not provided by known data carrier enclosures.

It should be noted that the term data carrier is used herein to cover any form of object capable of carrying machine or computer-readable data, including but not restricted to compact disks (of 15 cm diameter or other sizes), digital video disks (of 15 cm diameter or other sizes), floppy disks, tape cassettes (eg audio tape or video tape), smart cards, data cartridges and computer read-only only or random access memory chips (ROM or RAM).

The term data is also used in a broad sense to cover any form of information or programs in any machine or computer-readable format.

DISCLOSURE OF INVENTION

According to a first aspect of the present invention, there is provided an enclosure holding a disked-shaped data carrier with a central aperture, the enclosure comprising: a base portion; retaining means provided on the base portion for releasably engaging the central aperture and thus holding the data carrier within the enclosure; and closure means arranged to prevent removal of the data carrier from the enclosure, at least part of the closure means being integrally formed or bonded directly with the base portion, or with a component permanently mounted thereto, around a substantial portion of the periphery of the data carrier or of the enclosure so as to provide an irreversibly breakable join therebetween which, when broken, enables the closure means to be opened to allow the data carrier to be removed from the enclosure.

According to another aspect of the invention, there is provided an enclosure for holding a disk-shaped data carrier having a central aperture, the enclosure comprising: a base portion; retaining means provided on the base portion for releasably engaging the central aperture and thus holding the data carrier within the enclosure; and closure means comprising a plastics film or sheet connected to the base portion by a direct bond therebetween around a substantial portion of the periphery of the data carrier or of the enclosure whereby movement of the closure means between a closed position and an open position by breaking at least part of the bond therebetween allows the data carrier to be removed from the enclosure.

According to a further aspect of the invention, there is provided the use of an enclosure or apparatus as described above for holding a data carrier without a cover for the outermost face of the data carrier.

Other features of the invention will be apparent from the following description and from the subsidiary claims of the specification.

BRIEF DESCRIPTION OF DRAWINGS

The invention will now be described with reference to the accompanying drawings, in which.

BEST MODE OF CARRYING OUT INVENTION

FIGS. 1a shows an enclosure for housing a disk, eg a CD. The disk 1 (see FIG. 2) is releasably held in the enclosure by disk-holding means which engage the central aperture of the disk. There are many types of disk-holding means known in the art including those described in the applicants patent specifications WO 96/14636 and WO 97/41563 the disclosure of which is incorporated herein.

Figure 1:
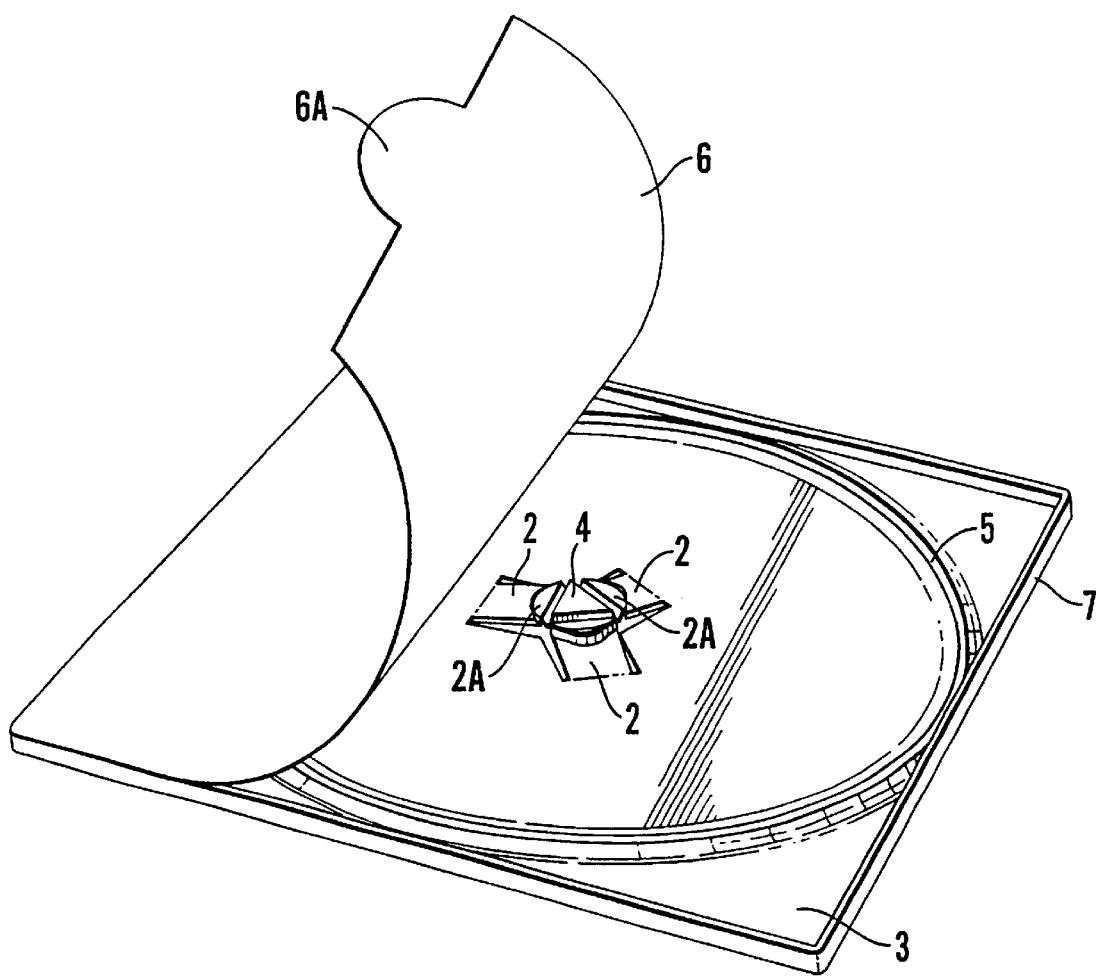
FIG. 1 is a perspective view of an enclosure for housing a disk according to a first embodiment of the invention (with the disk removed)

The disk-holding means shown in FIGS. 1 comprises three arms 2 resiliently cantilevered from a base 3, the inner end of each arm 2 being provided with a segment-shaped portion 2A connected by a hinge to one side of a triangular portion 4 which thus joins the inner ends of the three arms 2. The portions 2A and 4 together form a substantially circular button-like portion which is shaped to fit through the central aperture of a disk. The curved side of each segment shaped portion 2A is provided with a projection or lip 2B (see FIG. 2) which, when a disk 1 is mounted on the device, engages on the outwardly facing surface of the disk, i.e. the upper surface of the disk 1 in the orientation shown in FIG. 2, to securely retain it thereon. To release the disk, the button-like member is depressed so as to cause the arms 2 to flex about their connections to the base 3 whereby the diameter of the button-like member decreases until the lips 2B release their engagement on the disk.

Release of the disk from the disk holding means is further facilitated by provision of support means 5 on the base 3 such that as the button-like member is depressed the periphery of the disk is supported by the support means 5 so the central portion of the disk is flexed downwards by the action of the button-like member until the engagement of the lips 2B thereon is released, whereupon the disk is able to revert to its unflexed state and the centre of the disk moves upwards to prevent it being re-engaged by the disk-holding means when the button-like member is released. It should be noted that the degree of flexing in this process is small, the movement of the centre of the disk relative to the periphery often being only 1mm or even 0.5 mm or less. It should also be noted that, as the disk flexes in the form of a diaphragm, this flexing is evenly spread over the disk and not concentrated along a line.

The action of this and other disk-holding means is described in more detail in WO 96/14636 and in WO 97/41563.

As shown in FIG. 1, the enclosure is also provided with peel-off closure means 6 (shown partially peeled back). This typically comprises a plastics film which may have or one or more other films of plastics, metal or paper laminated therewith. The peel-off closure means is releasably secured to the top of an upstand 7 provided around the periphery of the base 3, eg by adhesive or a welded bond therewith. The welded bond may be formed by a simple heat seal between the closure means and the base 3. The film 6 is provided with a tab 6A which may be gripped by a user and used to peel the film away from the upstand 7 so as to provide access to a disk held within the enclosure and the disk holding means. The tab 6A may project from one side of the closure means 6 (as shown in FIG. 1) or may comprise a liftable corner of the closure means 6.

The plastics film may, for example, be approximately 100 microns thick, and comprise a laminate including a polyethylene layer heat welded to the upstand 7 and other layers to provide the required strength, stiffness and printability.

The peel-off closure means 6 may be used to carry information, eg describing and/or advertising the contents of the disk held in the enclosure and in particular may be used to inform the user that removal of the peel-off closure means 6 indicates acceptance by the user of specified conditions of purchase, eg acceptance of a license agreement. Prior art disk enclosures use the breaking of a seal provided by an adhesive label or removal of packaging to indicate acceptance of a license agreement and the peel-off closing means 6 provides another way of indicating this. The peel-off closure means 6 may thus be regarded as a label secured to the base 3 which both provides information to the user and serves as closure means.

If desired, the peel-off closure means may be wholly or partially transparent so the disk 1 can be seen therethrough.

Figure 2:
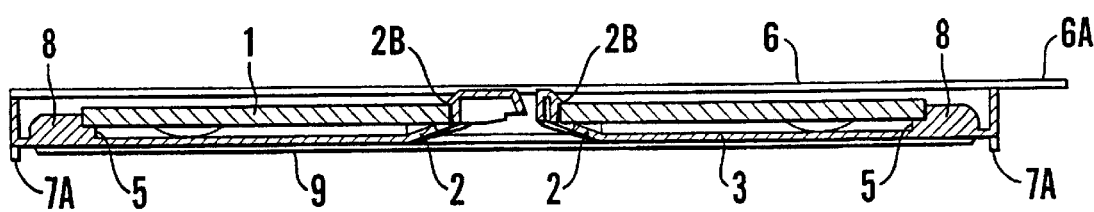
FIG. 2 is a cross-sectional view of an enclosure for housing a compact disk according to a second embodiment of the invention (with a disk shown held therein)

FIG. 2 is a cross-sectional view of an enclosure similar to that of FIG. 1 but with a different form of disk holding means, eg of the form shown in FIGS. 8 and 9 of WO 97/41563, which comprises two arms 2 resiliently cantilevered from the base 3, the inner ends of which form a button-like member divided by an S-shaped gap. The action of this disk holding means is, however, similar to that of FIG. 1, as described further in WO97/41563.

FIG. 2 shows a disk 1 held in the enclosure and the peel-off closure means 6 in the closed position. The disk 1 is held so the side carrying the data faces and is thus protected by the base 3.

Peeling back of the peel-off closure means 6 breaks the bond between the closure means 6 and the upstand 7 and results in irreversible damage to the bond between the closure means 6 and the upstand 7 and/or to the closure means 6, eg due to stretching, creasing, tearing or the like, so it is not possible to re-seal the enclosure with the peel-off closure means 6 once it has been opened.

The above feature also renders the enclosure tamper-evident in that any attempt to open it to gain access to the disk held therein is irreversible and will result in visible damage to the closure means 6 and/or visible damage to the bond between the peel-off closure means 6 and the upstand 7.

If adhesive is used to secure the peel-off closure means 6 to the upstand 7, this is preferably of a nature which does not readily re-seal once the bond has been broken. The adhesive used may, for example, be a heat-cured adhesive or an adhesive cured by ultra-violet or infra-red radiation.

Once the peel-off closure means 6 has been removed, the underside of the disk (which carries the data held thereon) remains protected as it faces towards the base 3 and by the provision of an upstand 8 adjacent the periphery of the disk. Various forms of upstand 8 may be provided and the reader is again referred to WO96/14636 and WO97/41563 for examples and further details. As shown in FIG. 2, the support 5 may comprise a step on the inner side of the upstand 8.

In an alternative arrangement (not shown), the peel-off closure means 6 may be secured to the upstand 8 instead of (or in addition to) the upstand 7.

The upstand 7 and/or 8 should preferably project from the base 3 by a distance sufficient to ensure that the peel-off closure means 6 does not touch the disk 1 when secured to the upstand 8, although, in some cases, the arrangement may be such that the peel-off closure means 6 engages the disk 1 when it is in the closed position.

In other arrangements, the enclosure may be arranged so there is room for a leaflet or booklet to be positioned on top of the disk 1 beneath the peel-off closure means 6.

The peel-off closure means 6 may be similar to known peel-off closure means used in other applications, e.g. a thin plastics film, or foil-like closure means as used in the food industry for sealing food containers or the medical industry for sealing sterile containers. Alternatively, the enclosure means may be relatively rigid, e.g. in the form of a cardboard or plastics sheet which has a tendency to adopt a flat form.

However, unlike such prior art, in which the container is usually a disposable item, the apparatus described herein is designed to be retained and used to hold the disk after the closure means 6 has been removed and thrown away. The peel-off closure means 6 is used to provide extra protection for the disk between the time it is manufactured to the time it is sold to the end user and to provide sales information and/or an indication of the acceptance of a license agreement as discussed above. Once the enclosure has been opened by the end user, the remaining apparatus provides sufficient protection for the disk. This arises from the fact that the function of the disk holding means is independent of the presence of the peel-off closure means 6 and by the fact that the disk is positively held on the apparatus by the disk-holding means as described above and can only be removed therefrom by depression of the button-like member.

In particular, as discussed further in WO96/14636 and WO97/41563 referred to above, the disk holding means and/or the upstand 8 are preferably designed so that it is not possible to prise the disk off the apparatus by lifting an edge of the disk.

Furthermore, end users are likely to store their collection of disks in a box or a racking system which provides additional protection so it is not necessary for each disk to be enclosed in its own individual container. This is in contrast to the usual practice in this field and stems from the realisation that, as only one side of the disk, i.e. the side that carries the data, requires particular protection, a disk holder need only be one sided, i.e. it need only protect one side of the disk and does not need to be in the form of an enclosure.

As described above, the apparatus described herein, in effect, encloses the sensitive side of the disk, by means of the base 3, the upstand 8 positioned close to the periphery of the disk and the opposite side of the disk itself which protects the recorded side of the disk from potential harm originating from sources on the other side of the disk. Furthermore, the apparatus described herein provides a rigid support which helps protect the disk from flexing, bending or warping which are often the main causes of damage to a disk.

In addition to the above, the upstand 7 (or 8) is preferably of a height such that if the apparatus is laid on a flat surface with the rear surface of the base 3 uppermost, at least the disk 1, and preferably also the disk-holding means, do not touch the surface. The disk 1 may, for example, be held at least 0.3 mm and preferably 1 mm or more away from the surface. The button-like member of the disk holding means may be at the same level as the upstand 7 (or 8) so it may just touch the surface (but not be pressed thereby) or may be spaced from the surface, e.g. by up to 0.7 mm or more. Thus, the upstand 7 is configured such that if the apparatus is positioned with the upstand against a substantially flat surface, the disk 1, and preferably the disk holding means as well, are held away from the surface.

The enclosure after the peel-off closure means 6 has been removed thus provides apparatus for holding the disk, there being no necessity to provide an additional cover, lid or other container over the outermost face of the disk. The rear face of the base 3 may be provided with a label 9 and, in effect, be used as the front face of the product with the disk held on the other side of the apparatus. As indicated above, such apparatus can be laid on a flat surface such as a table or desk with the disk on the underside, protected from contact with the table by the upstand 7 (or 8), with the label 9 uppermost.

The rear face of the base portion 3 is also preferably provided with a small upstand 7A (see FIG. 2) e.g. less than 1 mm high and preferably less than 0.5 mm, around the periphery thereof to protect the label 9 from being worn or scuffed when the enclosure is placed on a surface with its rear face nearest the surface.

The base 3 may also be formed of transparent or translucent material in which case the label 9 may be printed on both sides as the side secured to the underside of the base 3 will be visible through the base 3.

In a further embodiment (not shown), disk holding means may be provided on both major faces of the base 3 so a disk can be held on each side of the base, e.g. by affixing two enclosures back to back or by using an alternative form of disk holding means that can be formed on both sides of a single base.

As the upstand 7 (or 8) functions to support the apparatus when laid against a surface as well as providing a frame around the apparatus, it is preferably of a substantially rigid and sturdy construction.

The base 3, disk-holding means and upstands 7 and 8 are preferably formed as an integral plastics moulding which can be formed in a one-shot injection moulding process.

As indicated above, the reverse side of the base 3 may be used to provide information and/or advertising relating to the contents of the disk held on the device. This may be provided by a printed sheet 9 (see FIG. 2) held within a sleeve (not shown) or, preferably, by a printed sheet or label adhered to the reverse side of the base 3. In the latter case, the sheet 9 also serves to provide a seal across apertures in the base 3 formed during the fabrication of the arms 2 and button-like member.

The reverse side of the base 3 preferably comprises a large flat surface as shown in FIG. 2. As mentioned above, a small upstand is preferably provided around the periphery of the reverse side of the base to protect the sheet or label 9 from scuffing when the apparatus is laid down with the sheet or label underneath.

If the upstand 7 or 8 to which the peel-off closure means 6 is secured is continuous, the disk is held in a sealed enclosure whilst the peel-off closure means is in place and thus sealed against the ingression of dust or moisture whilst it is in transit or in storage prior to its use and whilst it is on display in a retail outlet. Once the enclosure has been opened by the end-user, a similar level of protection is not generally required as end-users are more likely to take care of their disks and often store them in purpose-made racking systems. The home or office environment in which a disk is used also usually subjects the disk to less extreme conditions than it might experience before it reaches the end-user.

In further embodiments of the invention, the closure means may be arranged so that it can be peeled back to open the enclosure but not removed therefrom, so it is retained to provide re-usable closure means for the enclosure. Whilst the base 3 can alone protect the sensitive side of the disk as described above, in some applications it is still desirable for the enclosure to retain a lid.

In a simple form (not shown), this may be achieved by bonding one edge of the closure means 6, e.g. the edge opposite the tab 6A, to the base 3 by a stronger form of adhesive, heat weld or any other permanent method of fixing, so the closure means remains attached to the base portion 3 when opened in the manner shown in FIG. 1. In addition, a re-sealable form of adhesive (or other form of holding means) is provided on the closure means, e.g. on the tab 6A, so when the closure means is closed again, it can be releasably held in a closed position by this re-sealable means.

Figure 3:
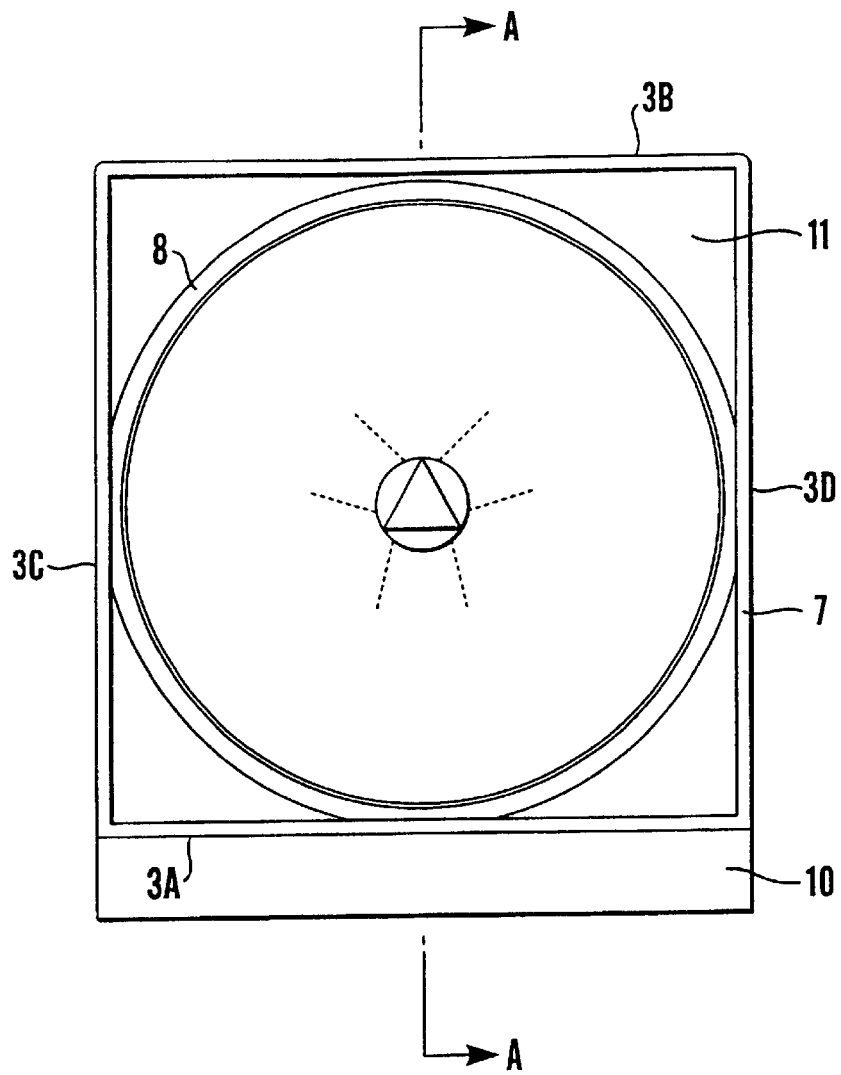
FIG. 3 is a schematic plan view of a third embodiment of the invention.
Figure 4:
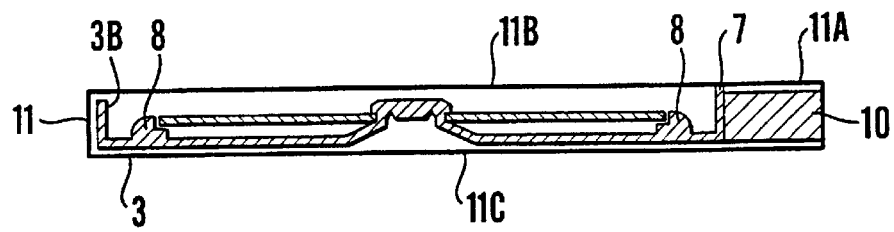
FIG. 4 is a schematic cross-sectional view of the third embodiment taken along line A—A shown in FIG. 3.

FIGS. 3 and 4 show an embodiment in which the closure means remains attached to the enclosure so it can be retained as a lid for the enclosure. The enclosure shown in FIGS. 3 and 4 has a base 3, upstands 7 and 8 and disk holding means similar to those of FIGS. 1 and 2, although the base 3 has an extension 10 on one side 3A thereof. The closure means comprises a sheet 11 which is adhered to the underside of the base, extends around an edge 3B of the base, and then extends across the upper surface of the base to the opposite side 3A of the base and is provided with a fastener portion 11A for fastening to the extension 10 of the base 3. The sheet 11 is initially bonded to the upstand 7 along side 3A and sides 3C and 3D (which extend between sides 3A and 3B) of the base by a welded joint or by an adhesive which does not readily re-seal once the bond has been broken, e.g. a heat-cured adhesive or an adhesive cured by ultra-violet or infra-red radiation as described in relation to the embodiment shown in FIGS. 1 and 2.

The sheet 11 may also, if desired, be secured to the edge 3B of the base or to the upper surface of the base in the region of the edge 3B in addition to its securement to the rear face of the base.

The fastener portion 11A of the enclosure means is releasably fastened to the extension 10 of the base by means of a re-useable adhesive strip, such as that used on Post-it (Trade Mark) notes manufactured by 3M, which can be repeatedly released and re-sealed, or by some other form of releasable fastening.

When the enclosure is first used, the fastener portion 11A is lifted away from the extension 10 and the sheet 11 peeled back so the irreversibly breakable bond with the upstand 7 along sides 3A, 3C and 3D of the base 3 is broken. The sheet 11 remains attached to the base 3 along (or adjacent) the edge 3B thereof, and the join therebetween acts as a hinge between the base 3 and the portion 11B of the sheet that has been peeled away from the upstand 7. This portion 11B can then be used as a lid and used to close the enclosure again by laying it over the upper surface of the base 3 and refastening the fastener portion 11A thereof to the extension 10.

In a further arrangement (not shown), the irreversibly breakable join between the closure means and the base may be provided by a weak portion adjacent the edge of the closure means, such as a partially cut through area or a line of spaced cuts, or by a tear off strip along the edges of the closure means.

The base 3 is again preferably provided with a small upstand, similar to that shown at 7A in FIG. 2, along sides 3A, 3C and 3D of its underside to protect the portion 11C of the sheet on the underside of the base from being worn or scuffed when the enclosure is laid on a surface such as a desk or table. This upstand may also extend around the edge 3B of the base to protect the portion of the sheet extending around this edge.

The extension 10 is preferably formed so as to provide an upper surface to which the fastener portion 11A can be fastened and a lower surface which forms a continuation of the underside of the base 3 to which the portion 11C of the sheet can be affixed.

The sheet 11 used in the embodiment shown in FIGS. 3 and 4 may be printed as a single flat sheet prior to being adhered to the base. The sheet 11 may, thus, be used to provide information on the underside of the base, information along the edge 3B of the base (which, in use, is, in effect, similar to the spine of a conventional CD box) and information on the upper side of the base. The portion 11B of the sheet 11 which lies over the upper side of the base 3 is, preferably, at least partially transparent, so a disk held in the enclosure can be seen there through.

The enclosure shown in FIGS. 3 and 4 comprising a base and a sheet extending from one side of the base around to the other side thereof, can be made very thin, especially if the sheet is in the form of a thin, foil-like sheet or a thin plastics or laminated plastics sheet. The sheet may typically have a thickness in the range 150–200 microns, eg around 170 microns.

Figure 5:
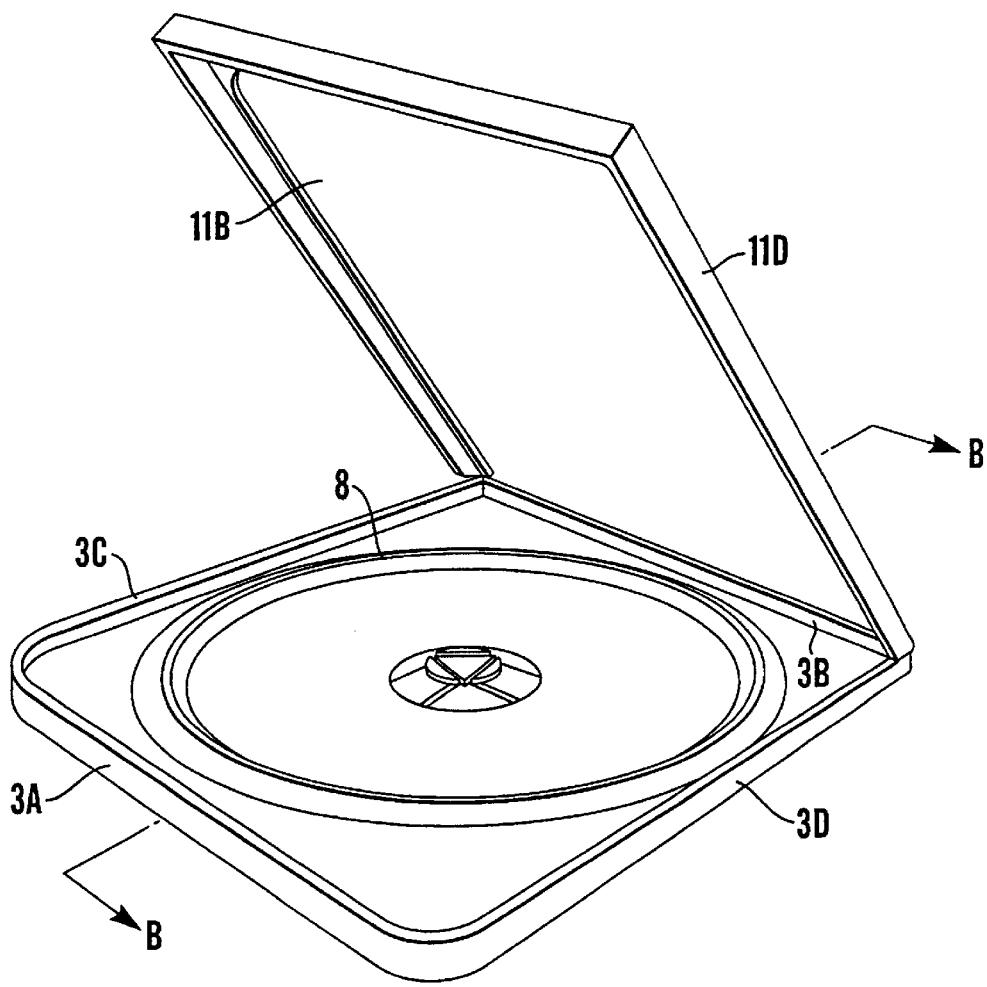
FIG. 5 is a schematic perspective view of a fourth embodiment of the invention, shown in an open position.
Figure 6:
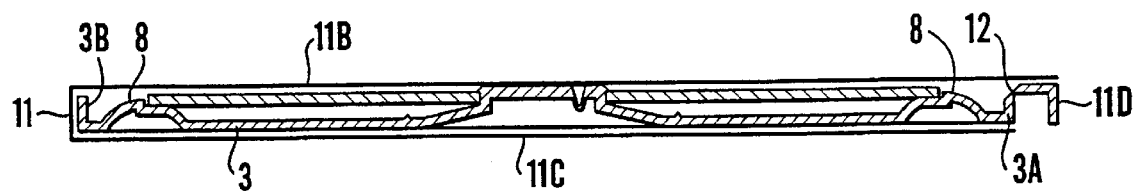
FIG. 6 is a schematic cross-sectional view of the fourth embodiment, taken along line B—B of FIG. 5, but shown in a closed position.

FIGS. 5 and 6 show a further embodiment of an enclosure in which the closure means is initially joined to the base portion in such a manner that, at least part of the join can be broken to enable the closure means to be opened to allow removal of the disk but in which the closure means remains attached to the base portion so it can subsequently be used as a re-sealable lid.

In this embodiment, the peripheral portion 11D of the closure means around sides 3A, 3C and 3D of the base is integrally formed with the base portion 3, and joined thereto by a breakable portion 12, such as a thin or weakened area of the plastics material extending around the edges of the closure means. The remainder of the closure means comprises a sheet 11 similar to that described above but in this case permanently adhered or affixed to the peripheral portion 11D of the closure means rather than to an upstand on the base portion 3.

The breakable portion 12 may comprise a narrow area of the plastics material which extends along the edges of the closure means and has a thickness less than the adjacent areas so that the closure means and base can be pulled apart by a tear propagating along this narrow, weakened area of plastics material. The breakable portion 12 is preferably provided at the corner between the vertical edge 3A of the base and a horizontal portion of the peripheral portion 11D (as shown in FIG. 6) so it can be easily formed during a moulding process.

The breakable portion may also be provided by an intermittent line of cuts or incisions extending along the edges of the closure means to provide a weakened area which enables the closure means and base to be torn apart.

FIG. 5 shows this embodiment in an open position after the join between the peripheral portion 11D of the closure means and the sides 3A, 3C and 3D of the base portion has been broken, so the closure means can be opened. As in the embodiment described above, the closure means remains attached to the base 3 along the edge 3B of the base, this attachment forming a hinge for the closure means.

FIG. 6 is a cross-sectional view of the enclosure shown in FIG. 5, along the line B—B, but with the closure means shown in the closed position. As shown, the peripheral portion 11D of the closure means is initially joined to the edge 3A of the base (and also to the edges 3C and 3D which are not shown in FIG. 6) by the breakable portion 12. When the part of the peripheral portion 11D joined to the edge 3A is first lifted away from the base 3, e.g. by means of a tab provided on the peripheral portion 11D at one end of the edge 3A, the join 12 therebetween is broken and as the closure means continues to be lifted away from the base 3, the break in this join travels along the sides 3A, 3C and 3D of the base in the form of a tear. Once the closure means has been opened in this manner, the disk held in the enclosure can be removed.

The closure means can then be moved to the closed position again and may be held in this position by an interference fit between the sides of the base 3 and the sides of the peripheral portion 11D which overlap with each other (as shown in FIG. 6). A fastener or clip or other re-sealable means may, if desired, also be provided between an edge of the base 3 and a side of the peripheral portion 11D to releasably hold the peripheral portion, and hence the closure means, in the closed position.

In a modified form of the enclosure shown in FIGS. 5 and 6, the peripheral portion 11D and the edges 3A, 3C and 3D of the base may be integrally formed with each other and separated by means of a tear-off strip as used to provide tamper-proof lids of some medicine or food jars.

In another arrangement, the tear-off strip may be formed separately and joined to the closure means and base by irreversibly breakable joins. In a further arrangement, a tear-off strip may be provided along one edge of the base, e.g. along edge 3A, and narrow, weakened areas (as described above) provided along edges 3C and 3D.

In the embodiment shown in FIGS. 5 and 6, it will be appreciated that the base 3, disk engaging means and the peripheral portion 11D of the closure means are initially formed as a one-piece moulding, a disk is then inserted into the enclosure through the opening between the sides of the peripheral portion 11D and the sheet 11 then attached to the peripheral portion 11D and base 3. In this case, the sheet 11 is permanently adhered to the peripheral portion 11D and to the base 3 as it is not designed to be removed again.

In a further embodiment (not shown), the peripheral portion 11D of the closure means may be a separate item to the base portion 3 and arranged to be irreversibly mounted on the base portion, e.g. by a one-way, snap-on fit (similar to that used for lids of medicine or food containers provided with integrally formed, tear-off strips). In this case, the breakable join or tear-off strip would be between an openable portion of the peripheral portion 11 and a portion thereof which has been irreversibly mounted on the base 3.

The portion(s) of the base 3 and closure means joined by the irreversibly breakable join should be sufficient to prevent removal of the disk from the enclosure. Preferably, this join extends around a substantial portion of the periphery of the disk or of the enclosure.

In a preferred arrangement, the join between the base 3 and the closure means prior to initial opening of the enclosure, provides a seal against the ingress of dust and/or moisture into the enclosure so, prior to initial opening of the enclosure, the disk is held within a sealed space. The irreversibly breakable join between the closure means and the base, together with the permanently affixed portion thereof (when applicable), thus preferably extend around the entire periphery of the disk and /or of the enclosure.

Another advantage of the invention is that it provides an enclosure which is relatively easy and is inexpensive to manufacture. As indicated above, the apparatus shown in the drawings is preferably designed so it can be manufactured by a one-shot injection moulding process. It will also be appreciated that other forms of enclosure (not shown) may be formed by other processes, e.g. vacuum forming, which similarly provide a fast and inexpensive manufacturing process and which is compatible with the provision of peel-off closure means. The manufacture of an enclosure with peel-off closure means is also less expensive than, for example, a folded cardboard cover.

The invention also enables the enclosure to be made very thin, e.g. less than 5 mm in thickness, and preferably as thin as 3 mm.

As indicated above, disks are often stored by the end-user in a racking system. To facilitate this, the base 3 is preferably shaped to fit conventional racking systems and/or may be provided with suitable engagement means (not shown) to facilitate its installation within a racking system. The base 3 may, if desired, also be provided with a removable tag, or means for receiving a tag, for identification purposes when the base 3 is held in a racking system in the form of a conventional card index.

The enclosure need not necessarily be of a square or rectangular shape and any other shape capable of housing and releasably holding the disk (or other form of data carrier) may be used. Whatever the shape of the enclosure, the irreversibly breakable join should be arranged to initially prevent removal of the disk from the enclosure but, when broken, enable the closure means to be opened to an extent sufficient to permit removal of the disk from the enclosure.

Although the apparatus described above is sufficient to hold and protect a disk as described, it may also be used as an insert or tray, e.g. for fitting within another enclosure such as a conventional jewel box or within a folded cardboard cover.

Although the invention has been described with particular reference to an enclosure holding a disk such as a CD, it will be appreciated that the use of peel-off closure means for similar purposes is applicable to enclosures adapted to releasably hold other forms of data carrier.

In a further aspect of the invention, an enclosure similar to those described above may be provided but with the irreversibly breakable join omitted or replaced by a re-sealable join. Such an enclosure is suitable for holding a blank, recordable data carrier, e.g. a CD-R, or for providing as an empty enclosure to house a data carrier already owned by a user. In such circumstances, the provision of an irreversibly breakable join to indicate acceptance of a licence agreement or to provide additional protection for the data carrier may not be required. Blank data carriers may, nevertheless, be provided in an enclosure such as described in relation to FIGS. 1 to 6 and, similarly, such enclosures may also be provided without a data carrier held therein, the user inserting their own data carrier once the enclosure has been opened.

What is claimed is:

1. An enclosure for use in holding a data carrier, the enclosure comprising:

a base formed of a plastic material;

a retention mechanism integrally formed with the base, wherein said retention mechanism releasably holds the data carrier within the enclosure;

a closure integrally formed with the base; and an irreversibly breakable join formed between parts formed of a plastic material, wherein said irreversibly breakable join is provided between said base and said closure, wherein said irreversibly breakable join, when broken, allows said closure to be moveable to an open position so as to allow the data carrier to be removed from the enclosure; wherein said retention mechanism is a disk-holding means for engaging a central aperture of a data carrier in the form of a disk.

2. The enclosure as recited in claim 1, wherein the disk-holding means comprises three arms resiliently cantilevered from said base.

3. An enclosure for use in holding a data carrier, the enclosure comprising:

a base;

a re-usable lid integrally formed with said base;

an irreversibly breakable join provided between an upstanding edge of said base and at least a first edge of said lid; and a data carrier retaining device integrally formed with said base, wherein said data carrier retaining device releasably engages the data carrier to secure the data carrier in the enclosure;

wherein said lid is permanently attached to said base permitting movement of said lid between an open and closed position after said irreversibly breakable join has been broken such that said lid continues to prevent removal of the data carrier from the enclosure in the closed position; and wherein said data carrier retaining device comprises a button-shaped member that releases engagement of said data carrier retaining device upon depression of the button-shaped member.

4. A disk storage device having a base portion and a lid for use in housing a disk, the disk storage device comprising:

a disk-holder, coupled to the base portion, wherein said disk-holder releasably engages a disk during storage of the disk in the disk storage device; and a breakable join irreversibly mounted on the base portion through a snap-on fit, wherein said breakable join is positioned between a peripheral portion of the lid and the base portion.

5. The disk storage device as recited in claim 4, wherein the base portion and the lid are joined by said breakable join so as to prevent removal of the disk from the disk storage device.

6. The disk storage device as recited in claim 5, further comprising a fastener provided between an edge of the base portion and a side of the peripheral portion of the lid, wherein said fastener releasably holds the peripheral portion in a closed position.

* * * * *